United States Patent [19]

Araki

[11] Patent Number: 5,285,029
[45] Date of Patent: Feb. 8, 1994

[54] DEVICE FOR DRIVING ELEVATOR AT SERVICE INTERRUPTION

[75] Inventor: Hiroshi Araki, Inazawa, Japan

[73] Assignee: Mitsubishi Denki Kabushiki Kaisha, Tokyo, Japan

[21] Appl. No.: 896,680

[22] Filed: Jun. 10, 1992

[30] Foreign Application Priority Data

Jun. 12, 1991 [JP] Japan .................. 3-139335
Aug. 29, 1991 [JP] Japan .................. 3-217769

[51] Int. Cl.$^5$ .................. H02J 9/06; H02M 5/452; H02M 7/758
[52] U.S. Cl. .................. 187/114; 187/119; 363/37; 363/98
[58] Field of Search .................. 187/119, 114; 307/66, 307/68; 363/37, 97, 98; 318/811, 803

[56] References Cited

U.S. PATENT DOCUMENTS

| | | | |
|---|---|---|---|
| 4,475,631 | 10/1984 | Nomura | 187/119 |
| 4,662,478 | 5/1987 | Uchino | 187/114 |
| 4,713,595 | 12/1987 | Yonemoto | 318/759 |
| 5,058,710 | 10/1991 | Iwasa | 187/114 |

FOREIGN PATENT DOCUMENTS 64314 1/1989 Japan .

*Primary Examiner*—R. Skudy
*Assistant Examiner*—Robert Nappi
*Attorney, Agent, or Firm*—Leydig, Voit & Mayer

[57] ABSTRACT

The device for driving an elevator at the time of a service interruption according to the present invention has a circuit for varying d-axis magnetic flux command to prevent regeneative power that can damage the elements in an inverter from being generated at the time of an interruption eliminating the need for a regenerative power consumption circuit.

8 Claims, 6 Drawing Sheets

DEVICE FOR DRIVING ELEVATOR AT SERVICE INTERRUPTION

BACKGROUND OF THE INVENTION

1. Field of the Invention

This invention relates to a device for driving an elevator at the time of a service interruption which is driven by a PWM inverter and more particularly to a device for driving an elevator at the time of a service interruption wherein a regenerative power consumption circuit is deleted to achieve cost reduction.

2. Description of the Related Art

Recently, a PWM inverter has been used for controlling an induction motor for driving an elevator in order to achieve purposes such as the reduction of power consumption. In the case of this type of elevator control device, since the PWM inverter is driven by the power supplied by a battery at the time of a service interruption, there is an advantage that it is not necessary to provide a complicated inverter controller, insulated DC-DC converter, or constant voltage circuit. For example, FIG. 5 illustrates the configuration of a conventional device for driving an elevator at the time of a service interruption disclosed in Japanese Patent Publication No. 64-314.

In the FIG. 1 represents a three-phase AC commercial power source; 2 represents normally open contacts of a contactor which is connected to the commercial power source 1 and excited when an elevator is running; 3 represents a PWM converter (hereinafter simply referred to as converter) converting the three-phase AC voltage of the commerical power source 1 into DC voltage; 4 represents a capacitor for smoothing the output voltage of the converter 3; 5 represents a regular PWM inverter (hereinafter referred to as regular inverter) for converting the DC voltage across the capacitor 4 into VVVF (variable voltage variable frequency) three-phase AC voltage; and 6 represents an induction motor for driving the elevator driven by the regular inverter 5.

7 represents a control circuit for controlling transistors in the regular inverter 5 in response to three-phase voltage command values $V_{IU}$, $V_{IV}$, and $V_{IW}$. 8 represents a velocity detector for detecting the rotor angular velocity $\omega r$ of the induction motor 6. 9 represents current detectors for detecting three-phase AC currents $1_{IU}$, $1_{IV}$, and $1_{IW}$ flowing from the regular inverter 5 to the stator (primary winding) of the induction motor 6.

10 represents a resistor connected across the capacitor 4. 11 represents a transistor which is series-connected to the resistor 10 to be controlled by the control circuit 7. The series circuit comprising the resistor 10 and transistor 11 constitutes a regenerative power consumption circuit for consuming the regenerative power generated by the induction motor 6 at the time of a service interruption. 13 represents a three-phase transformer which supplies power to the control circuit 7 and is connected to the commercial power source 1 at the primary side thereof.

14 represents a battery for supplying power to the regular inverter 5 and control circuit 7 at the time of an interruption at the commercial power source 1. 15 represents normally open contacts of a contactor which is connected to the battery 14 and is excited at the time of a service interruption. 16 represents a diode for supplying the regular inverter 5 with the DC power of the battery 14. 17 represents an inverter for service interruption which converts the DC voltage from the battery 14 into three-phase AC voltage at the time of a service interruption.

18 represents normally open contacts inserted between the inverter for service interruption 17 and the primary of the three-phase transformer 13. 19 represents normally closed contacts inserted between the commercial power source 1 and the primary of the three-phase transformer 13. The normally open contacts 18 and normally closed contacts 19 cooperate with a relay excited when the commercial power source 1 is interrupted, constituting a switching means for switching from the commercial power source 1 to the inverter for service interruption 17 to connect the latter to the primary of the three-phase transformer 13.

FIG. 6 is a block diagram showing the control circuit 7 in FIG. 5 in detail.

21 represents a three-phase-to-two-phase converter connected to the current detectors 9, for converting the three-phase AC currents $1_{IU}$-$1_{IW}$ into primary currents in a two-axis (d-q) rotary coordinate system, i.e., a d-axis current $I_{I}d$ corresponding to an exciting current and a q-axis current $I_{I}q$ corresponding to a torque current according to an AC frequency $\omega_{I}$.

22 represents a magnetic flux computing unit connected to the three-phase-to-two-phase converter 21 for computing a d-axis magnetic flux $\phi_{2}d$ which interlinks with the rotor (secondary) side according to the currents $I_{I}d$ and $I_{I}q$ and voltage command values $V_{I}d$ and $V_{I}q$ of the two axes.

23 represents a two-phase-to-three-phase converter for outputting the three-phase voltage command values $V_{IU}$, $V_{IV}$, and $V_{IW}$ to the regular inverter 5. It converts the voltage command values $V_{I}d$ and $V_{I}q$ in the two-axis rotary coordinate system into the three-phase voltage command values $V_{IU}$, $V_{IV}$, and $V_{IW}$ according to the AC frequency $\omega_{I}$.

24 represents a d-axis current controller for amplifying the deviation between a d-axis current command value $I_{ID}$ and the d-axis current $I_{I}d$ of the primary winding to generate the d-axis voltage command value $V_{I}d$. 25 represents a q-axis current controller for amplifying the deviation between a q-axis current command value $I_{IQ}$ and the q-axis current $I_{I}q$ to generate the q-axis voltage command value $V_{I}q$. 26 represents a magnetic flux controller for amplifying the deviation between a predetermined d-axis magnetic flux command value $\phi_{2D}$ according to the rating of the induction motor 6 and the d-axis magnetic flux $\phi_{2}d$ to generate the d-axis current command value $I_{ID}$. 27 represents a velocity controller for amplifying the deviation between a rotor angular velocity command value $\omega_{R}$ and a rotor angular velocity $\omega r$ to generate the q-axis current command value $I_{IQ}$.

28 represents a divider for obtaining the ratio $I_{IQ}/\phi_{2d}$ of the q-axis current command value $I_{IQ}$ to the d-axis magnetic flux $\phi_{2d}$. 29 represents a coefficient unit for multiplying the calculation result of the divider 28 by $\alpha$ to obtain a slip frequency command value $\omega s$.

30 represents a subtracter for obtaining the deviation between the d-axis magnetic flux command value $\phi_{2D}$ and the d-axis magnetic flux $\omega_{2}d$. 31 represents a subtracter for obtaining the deviation between the rotor angular velocity command value $\omega_{R}$ and the rotor angular velocity $\omega r$. 32 represents a subtracter for obtaining the deviation between the d-axis current command value $I_{ID}$ and d-axis current $I_{Id}$. 33 represents a subtracter for obtaining the deviation between the q-axis current command value $I_{IQ}$ and the q-axis current $I_{Iq}$. 34 represents an adder for adding a slip frequency command value $\omega s$ and the rotor angular velocity $\omega r$ to generate the AC frequency $\omega_I$.

Next, the operation of the conventional device for driving an elevator at the time of a service interruption shown in FIG. 5 will be described.

When the commercial power source 1 works properly, the normally open contacts 15 and 18 are open and the normall closed contacts 19 are closed, so the control circuit 7 is fed by the commercial power source 1. When the elevator is running, the normally open contacts 2 are closed. The regular inverter 5 is then fed by the commercial power source 1 through the converter 3. Therefore, the regular inverter 5 outputs three-phase AC power of a voltage and frequency in accordance with the three-phase voltage command values $V_{IU}$, $V_{IV}$, and $V_{IW}$ from the control circuit 7 to control the torque and revolution speed of the induction motor 6.

When the induction motor 6 generates regenerative power, the converter 3 regenerates the regenerative power at the side of the commercial power source 1 through the capacitor 4.

On the other hand, at the time of a service interruption of the commercial power source 1, the normally open contacts 15 and 18 are closed by the power of an emergency auxiliary power source (not shown) or the like to open the normally closed contacts 19. As a result, the control circuit 7 is disconnected from the commerical power source 1 and fed by the battery 14 through the inverter for service interruption 17.

At this time, the inverter for service interruption 17 converts the DC voltage from the battery 14 to generate three-phase AC voltage which is applied to the primary of the three-phase transformer 13 to feed the control circuit 7.

The DC voltage output by the battery 14 is also applied to the DC side of the regular inverter 5 through the diode 16.

Therefore, the control circuit 7 controls the regular inverter 5 in the same way as in the case that the commercial power source 1 works properly, and the regular inverter 5 controls the torque and the revolution speed of the induction motor 6.

At the time of a service interruption of the commercial power source 1, even if regenerative power is generated by the induction motor 6, it can not be returned to the commercial power source 1. As a result, there is a possibility that the voltage at the DC side of the regular inverter 5 will be increased and the elements in the regular inverter 5 are broken. Therefore, the control circuit 7 detects the regenerative power and brings the transistor 11 into a conducting state to consume the regenerative power through the resistor 10.

Next, the operation of the conventional control circuit 7 will be described with reference to FIG. 6.

First, the current detector 9 detects the three-phase AC currents $I_{IU}$, $I_{IV}$, and $I_{IW}$ flowing from the regular inverter 5 to the primary winding of the induction motor 6.

The three-phase-to-two-phase converter 21 converts the detected three-phase AC currents $I_{IU}$, $I_{IV}$, and $I_{IW}$ into the d-axis current $I_{Id}$ and q-axis current $I_{Iq}$ viewed from the two-axis rotary coordinate system (d-q coordinate system) rotating in synchronism with the frequency $\omega_I$ of the three-phase AC voltage applied to the primary winding of the induction motor 6.

According to the d-axis voltage command value $V_{Id}$, the d-axis current controller 24 performs control so that $I_{Id}$ equals $I_{ID}$ and a current in accordance with the command value flows. Similarly, according to the q-axis voltage command value $V_{Iq}$, the q-axis current controller 25 performs control so that $I_{Iq}$ equals $I_{IQ}$.

That is, the voltage command values $V_{Id}$ and $V_{Iq}$ are converted by the two-phase-to-three-phase converter 23 into three-phase voltage command values $V_{IU}$, $V_{IV}$, and $V_{IW}$ which are in turn applied to the regular inverter 5 to cause the desired current to flow through the induction motor 6.

On the other hand, the divider 28 and coefficient unit 29 calculate the slip frequency command value $\omega s$ on the basis of the relationship $\omega s = \alpha . I_{IQ}/\phi_{2d}$. The adder 34 adds the slip frequency command value $\omega s$ and the rotor angular velocity $\omega r$ to obtain the AC frequency $\omega_I$ of the voltage applied to the primary winding which is input to the three-phase-to-two-phase converter 21 and two-phase-to-three-phase converter 23.

Thus, the two-phase-to-three-phase converter 23 controls the regular inverter 5 so that the voltage with the AC frequency $\omega_I$ is actually applied to the induction motor 6.

As described above, when the induction motor 6 is controlled by the regular inverter 5 according to the control circuit 7 to decelerate and stop the elevator car or to drive it downward with a heavy load, the regenerative power produced by the induction motor 6 is returned to the DC side through the regular inverter 5. Further, when the commercial power source 1 is interrupted, in order to prevent the elements from being broken by the voltage increase at the DC side of the regular inverter 5, the transistor 11 is brought into a conducting state so that the regenerative power is consumed by the resistor 10.

As described above, the conventional device for driving an elevator at the time of a service interruption requires the regenerative power consumption circuit for protecting the elements in the regular inverter 5 as a countermeasure against the regenerative power produced by the induction motor 6 when the commercial power source 1 is interrupted, resulting in the problem of cost increase.

SUMMARY OF THE INVENTION

The present invention has been conceived to solve the above-described problems, and it is an object of the present invention to provide a device for driving an elevator at the time of a service interruption wherein cost reduction is achieved by varying the d-axis magnetic flux command value so that regenerative power is not produced at the time of a service interruption to eliminate the need for a regenerative power consumption circuit.

The device for driving an elevator at the time of a service interruption comprises an induction motor for driving an elevator, a converter for converting the ac voltage supplied by a commercial power source into dc voltage, a capacitor for smoothing the dc voltage obtained by said converter, a dc voltage detector for detecting the dc voltage across said capacitor, a regular inverter for converting the dc voltage smoothed by said capacitor into ac voltage to drive and control said induction motor. A control circuit for generating ac voltage command values and outputting them to said regular inverter, a battery for supplying power to said regular inverter when the commerical power source is interrupted, and a dc current suppression means for controlling the ac voltage command values generated by said control circuit so that the dc voltage across said capacitor detected by said dc voltage detector will not exceed set values when the commercial power source is interrupted.

DESCRIPTION OF THE PREFERRED EMBODIMENTS

Embodiments of the present invention will now be described with reference to the accompanying drawings.

Figure 1:
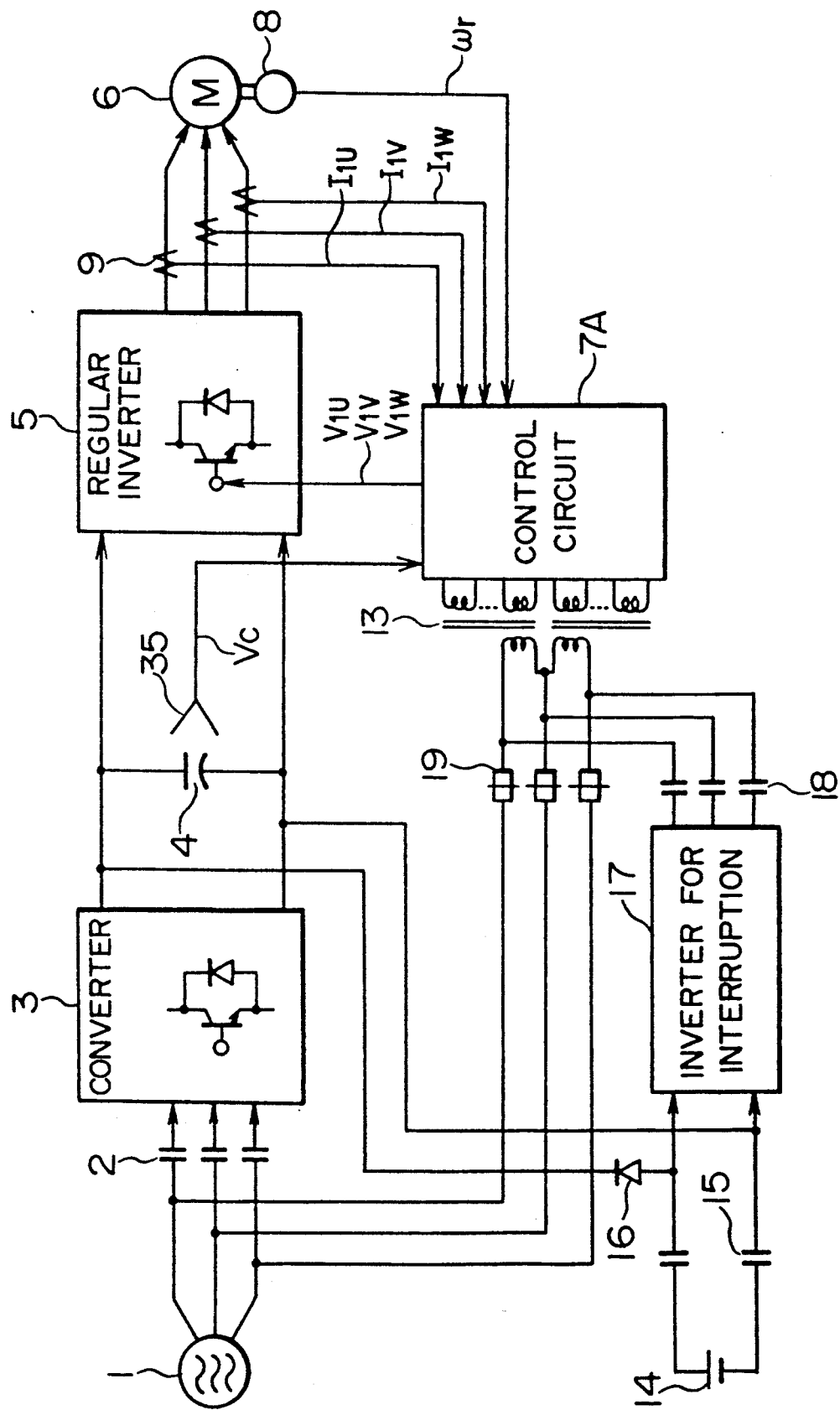
FIG. 1 is a block diagram showing a device for driving an elevetor at the time of a service interruption of a first embodiment of the present invention.
Figure 5:
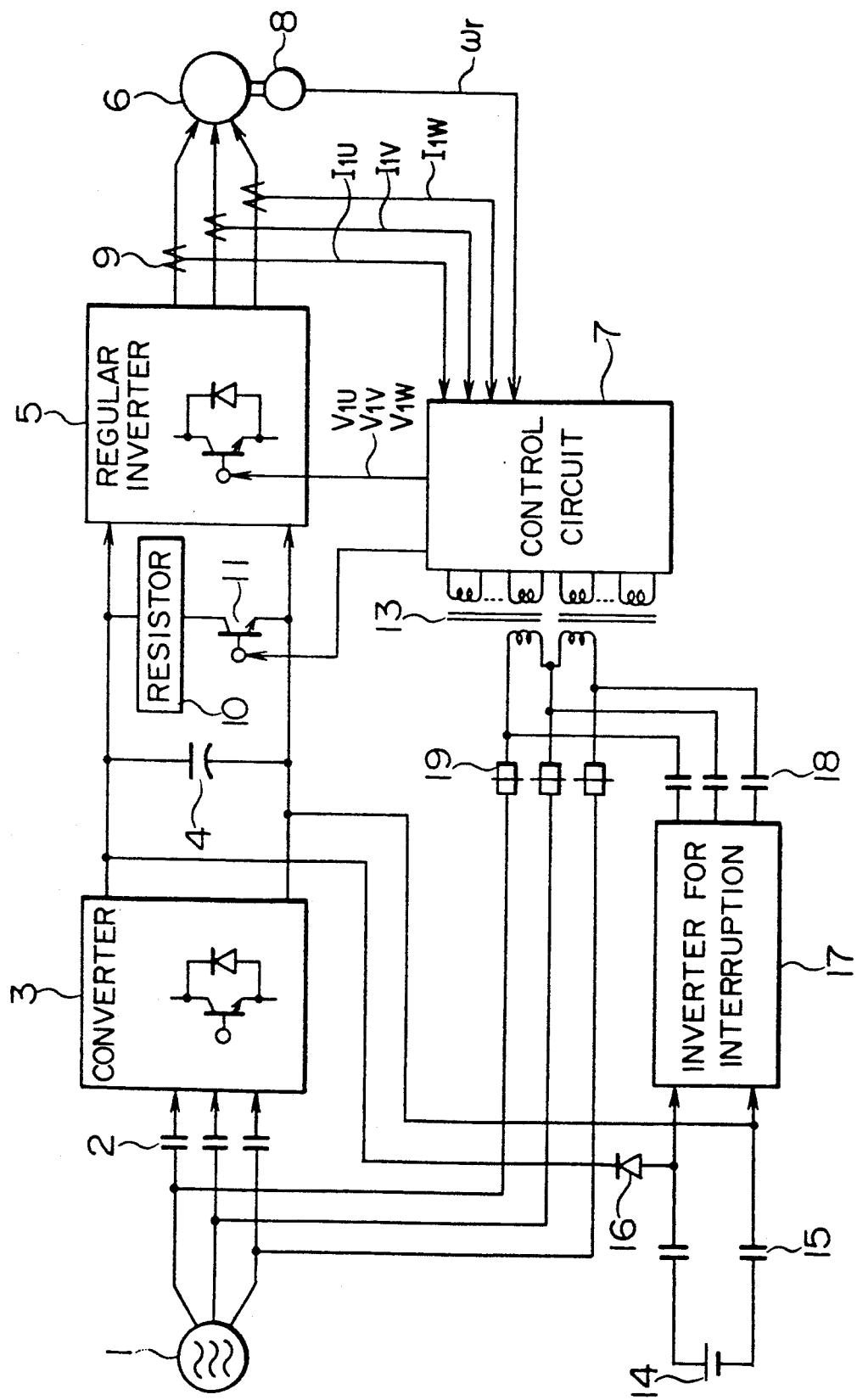
FIG. 5 is a block diagram showing a conventional device for driving an elevator at the time of a service interruption.

In FIG. 1, a commercial power source 1, normally open contacts 2, 15 and 18, a PWM converter 3, a capacitor 4, a regular inverter 5, an induction motor 6, a velocity detector 8, current detectors 9, a three-phase transformer 13, a battery 14, a diode 16, an inverter for service interruption 17, and normally closed contacts 19 are identical to those members having identical reference numerals of the conventional device shown in FIG. 5. A control circuit 7A is connected to the regular inverter 5, velocity detector 8, current detectors 9, and three-phase transformer 13. Further, a voltage detector 35 is connected to the capacitor 4 to detect the DC voltage Vc across the capacitor and, the voltage detector 35 is also connected to the control circuit 7A.

In the present embodiment, the control circuit 7 in the conventional device is replaced with the control circuit 7A In addition, the regenerative power consumption circuit comprising the resistor 10 and transistor 11 has been deleted while the voltage detector 35 for detecting the voltage across the capacitor 4 is connected to the control circuit 7A.

Figure 2:
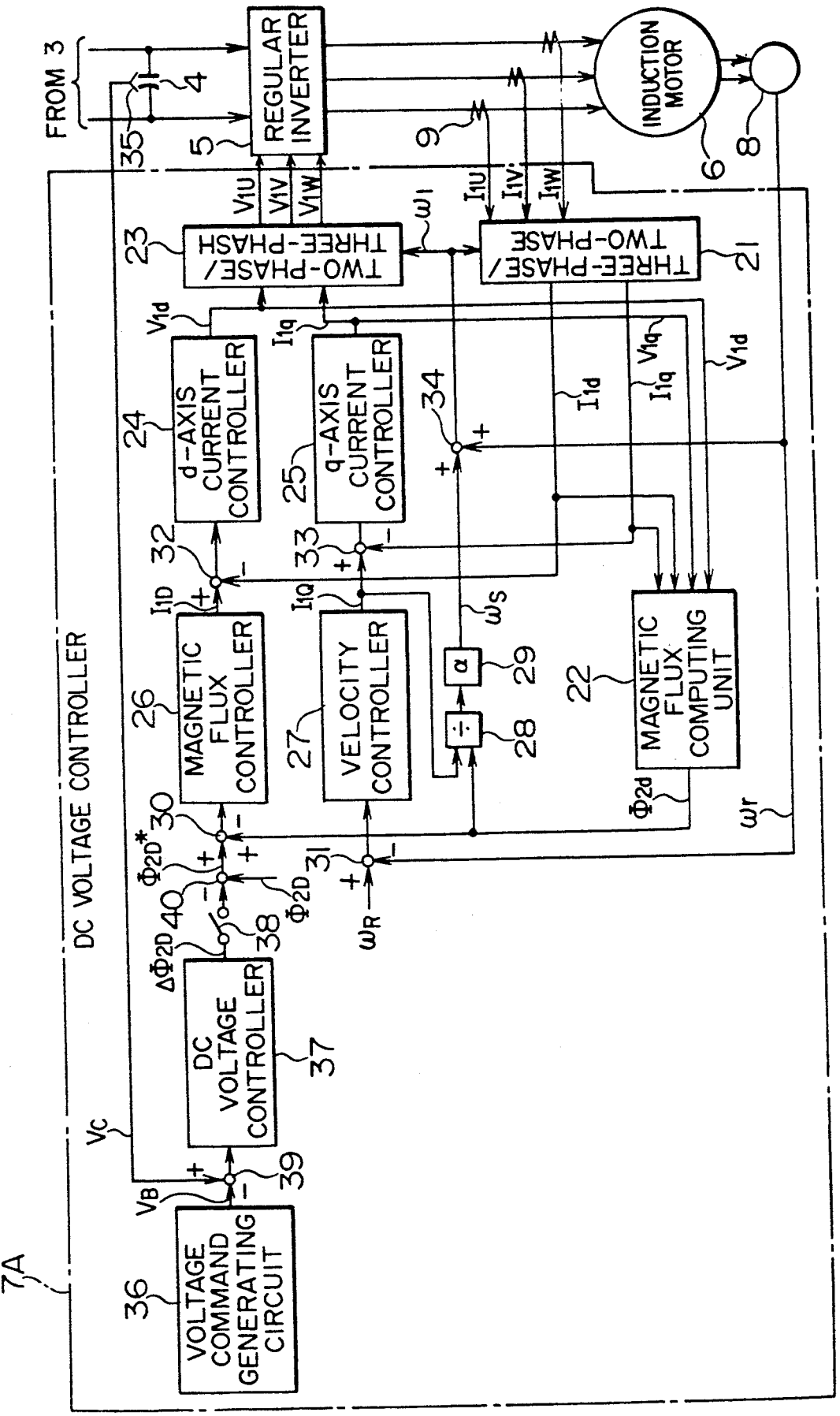
FIG. 2 is a block diagram showing the internal configuration of the control circuit shown in FIG. 1.
Figure 6:
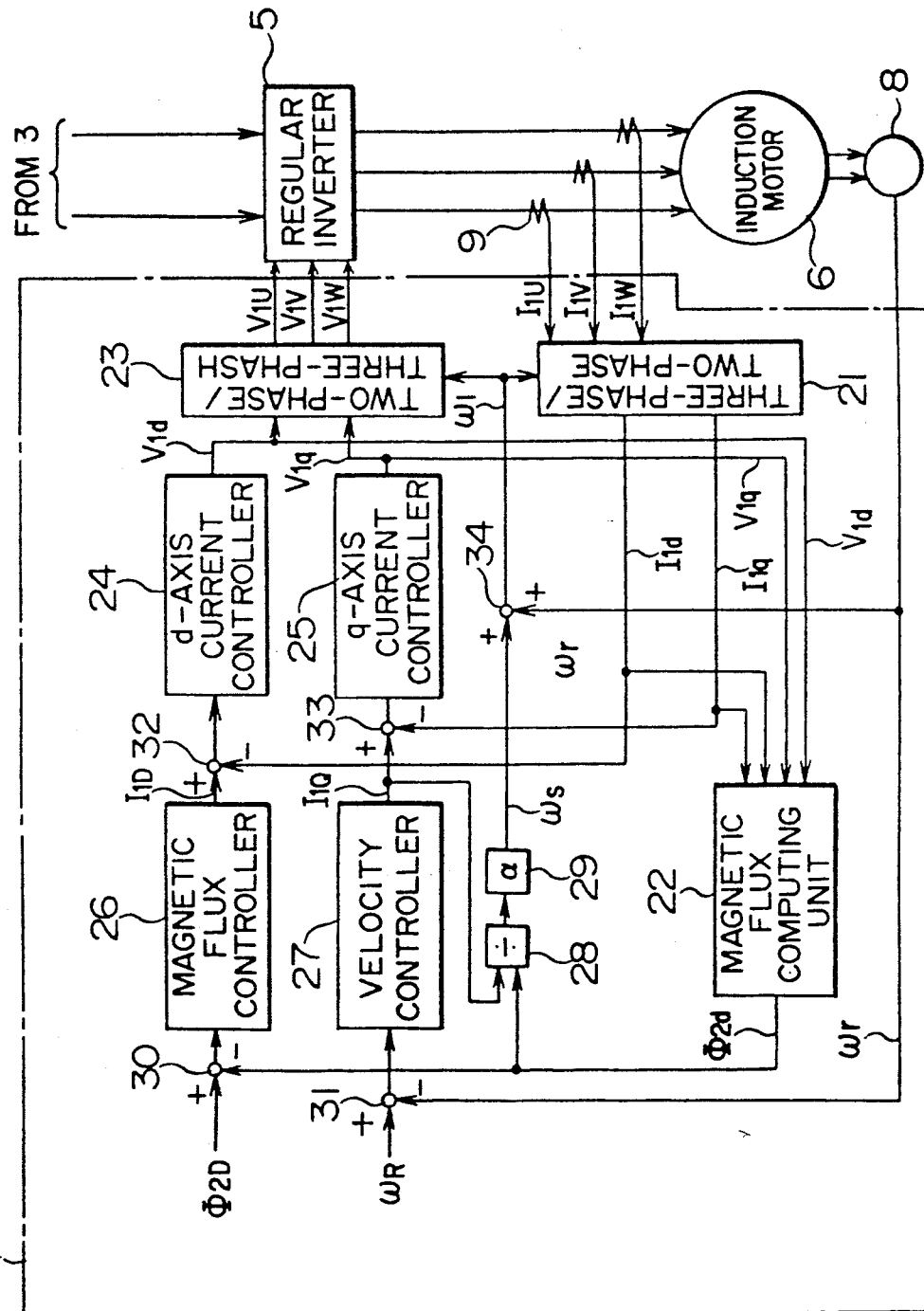
FIG. 6 is a block diagram showing the internal configuration of the control circuit shown in FIG. 5.

The internal configuration of the control circuit 7A is shown in FIG. 2. In this figure, a three-phase-to-two-phase converter 21, a magnetic flux computing unit 22, a two-phase-to-three-phase converter 23, a d-axis current controller 24, a q-axis current controller 25, a magnetic flux controller 26, velocity controller 27, a divider 28, a coefficient unit 29, subtracters 30-33, and an adder 34 are identical to those members having identical reference numerals of the conventional circuit shown in FIG. 6.

36 represents a voltage command generating circuit outputting a DC voltage command value $V_B$ which is set at, for example, the output voltage of the battery 14. 37 represents a DC voltage controller for amplifying the deviation ($V_c - V_B$) between a DC voltage Vc detected by the voltage detector 35 and the DC voltage command value (control voltage value) $V_B$ to generate a d-axis magnetic flux correction value $\Delta\phi_{2D}$. This part is constituted by, for example, a proportional integral element.

38 represents a normally open switch which is automatically turned on (closed) by an emergency auxiliary power source at the time of a service interruption and is inserted at the output side of the DC voltage controller 37. 39 represents a subtracter which obtains the deviation between the DC voltage Vc and the DC voltage command value $V_B$ and is inserted between the voltage command generating circuit 36 and DC voltage controller 37.

40 represents a subtracter which generates the deviation ($\phi_{2D} - \Delta\phi_{2D}$) between a d-axis magnetic flux command value $\phi_{2D}$ and the d-axis magnetic flux correction value $\Delta\phi_{2D}$ as a d-axis magnetic flux correction command value $\phi_{2D*}$ and is inserted between the switch 38 and the subtracter 30.

The voltage command generating circuit 36, DC voltage controller 37, switch 38, and subtracters 39 and 40 constitute a DC voltage suppression means for controlling d-axis current (exciting current) I d for the induction motor 6 so that the DC voltage Vc will not exceed a predetermined DC voltage command value V when the commercial power source 1 is interrupted.

Next, the operation of the first embodiment of the present invention shown in FIG. 1 and FIG. 2 will be described.

When the commercial power source 1 works properly, the switch 38 is open. Therefore, the voltage command generating circuit 36 and DC voltage controller 37 are not effective and the control circuit 7A operates in exactly the same way as the conventional control circuit 7.

On the other hand, when the commercial power source 1 is interrupted, the switch 38 is closed. Therefore, the voltage command generating circuit 36 and DC voltage controller 37 are effective and are involved in the d-axis magnetic flux command value $\phi_{2D}$.

First, the DC voltage Vc across the capacitor 4 detected by the voltage detector 35 is amplified by the DC voltage controller 37 after the DC voltage command value $V_B$ is subtracted therefrom at the subtracter 39. This results in the d-axis magnetic flux correction value $\Delta\phi_{2D}$ which is for conforming the DC voltage Vc across the capacitor 4 to the DC voltage command value $V_B$.

Next, the subtracter 40 subtracts the d-axis magnetic flux correction value $\Delta\phi_{2D}$ from the d-axis magnetic flux command value $\phi_{2D}$ to input the result to the subtracter 30 as the d-axis magnetic flux correction command value $\phi_{2D*}$.

Thus, the DC voltage Vc across the capacitor 4 is constantly controlled so that it conforms to the desired DC voltage command value $V_B$.

Specifically, when the induction motor 6 is in a state wherein regenerative power is produced, the DC voltage Vc across the capacitor 4 disposed at the DC side of the regular inverter 5 tends to increase due to the accumulation of the regenerative energy. However, the d-axis magnetic flux correction value $\Delta\phi_{2D}$ is subtracted from the d-axis magnetic flux command value $\phi_{2D}$ in accordance with the quantity by which the DC voltage Vc exceeds the DC voltage command value $V_B$.

Therefore, the d-axis current command value $I_{ID}$ corresponding to exciting current decreases in accordance with the regenerative energy that the induction motor 6 is about to produce to decrease the d-axis current Id.

While the rotor angular velocity ωr of the induction motor 6 is controlled to be constant in general, the torque is expressed by the product of the interlinking magnetic flux and orthogonal current and is proportionate to the product of the d-axis current (exciting current) $I_rd$ and q-axis current (torque current) $I_rq$. Further, the torque that the induction motor 6 must supply to an elevator car is determined by the number of people (load) in the elevator car.

Therefore, if the torque required for the induction motor 6 is fixed, a decrease in the d-axis current $I_rd$ results in an increase in the q-axis current $I_rq$.

Thus, the q-axis current command value $I_{1Q}$ and q-axis current $I_rq$ increase and the slip frequency command value ωs increases according to the aforesaid formula on the basis of the divider 28 and coefficient unit 29, increasing the loss at the induction motor 6.

As a result, the regenerative power that is about to be produced by the induction motor 6 is cancelled by the loss inside the rotor and is controlled so that it is entirely consumed in the induction motor 6. Therefore, the DC voltage Vc across the capacitor 4 is controlled so that it equals the DC voltage command value $V_B$. This means that there is substantially no regenerative power produced by the induction motor 6 when viewed from the side of the regular inverter 5.

In the above-described first embodiment, the DC voltage Vc is caused to follow the DC voltage command value $V_B$ in order to suppress the increase of the DC voltage Vc when the commercial power source 1 is interrupted. Alternatively, a determination means may be provided in addition to determine the level of the DC voltage Vc, and the voltage command generating circuit 36 and DC voltage controller 37 may be made available for causing the DC voltage suppression means to work only when the DC voltage Vc exceeds the DC voltage command value $V_B$.

When regenerative power is generated by the induction motor 6 at the time of a service interruption, the regenerative energy is accumulated in the capacitor 4 at the DC side of the inverter 5 and, as a result, the DC voltage Vc will be on the point of increasing. According to the first embodiment, however, the d-axis magnetic flux correction command value $\phi_{2D^*}$ decreases in accordance with the DC voltage command value $V_B$ depending on the regenerative energy. Therefore, it is possible to perform the control so that the entire regenerative energy will be consumed in the induction motor 6.

However, at a point in time when a service interruption takes place, the electrical charge that has been charged by the commercial power source 1 immediately before the interruption, still remains undischarged. This results in great deviation between the DC voltage Vc and DC voltage command value $V_B$, when the driving at interruption is activated. Thus the d-axis magnetic flux correction command value rapidly decreases making the control unstable and causing $\phi_{2D^*}$ the rapid discharge of the capacitor 4 that leads to the deterioration of the same capacitor.

In order to perform stable regenerative power control while preventing the deterioration of the service life of the capacitor 4, the electrical charge that has been charged when an interruption takes place, may be gradually discharged at a constant gradient in a predetermined quantity at a time, and the regenerative power may be made zero through the critical damping control of said induction motor 6.

Next, a description will be made on a second embodiment of the present invention wherein the DC voltage command value $V_B$ is gradually decreased starting with the DC voltage Vc.

Figure 3:
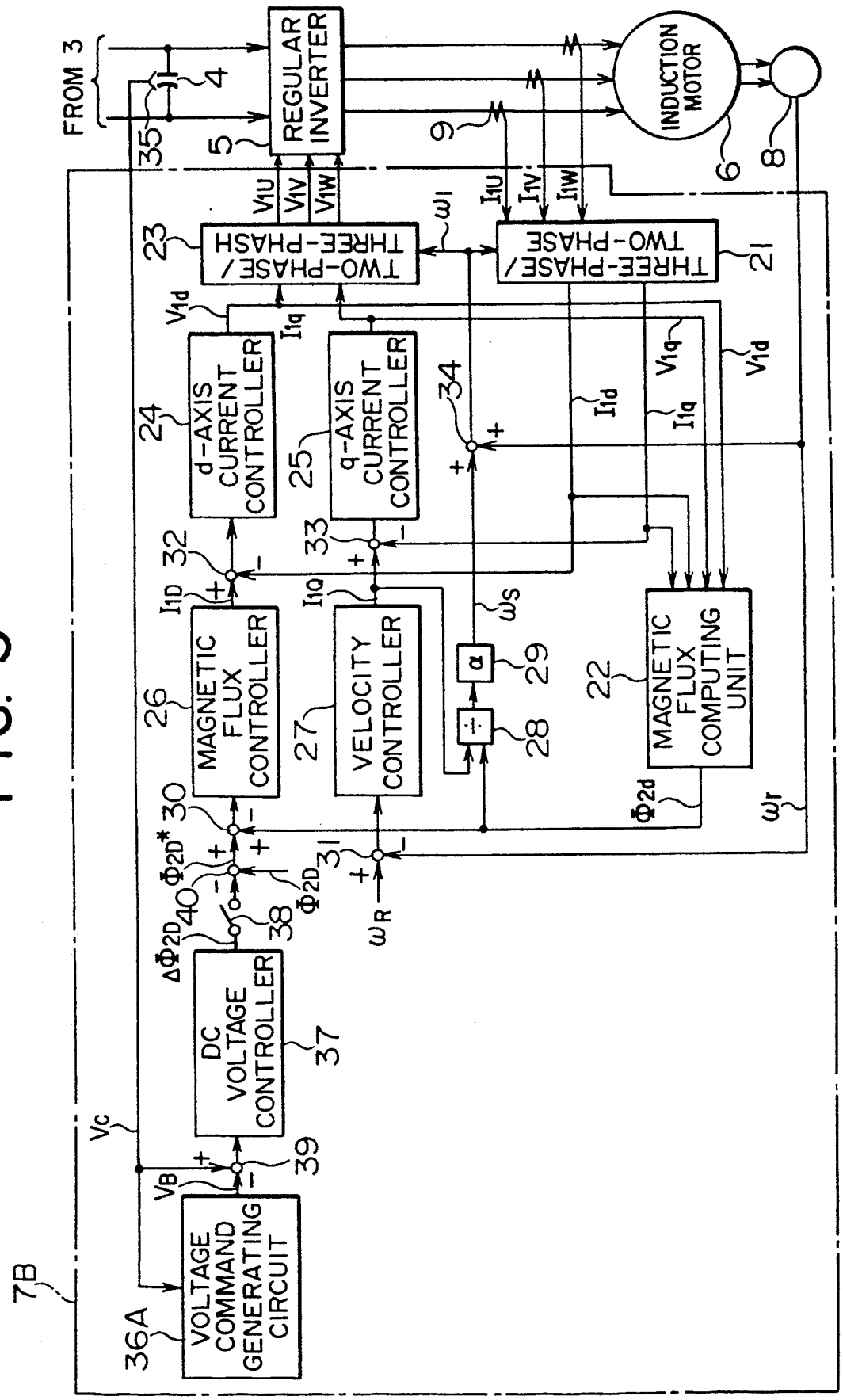
FIG. 3 is a block diagram showing the internal configuration of a control circuit of a second embodiment.

As shown in FIG. 3, in a control circuit 7B of the second embodiment, a voltage command generating circuit 36A is connected to the subtracter 39 instead of the voltage command generating circuit 36 of the control circuit 7A in the first embodiment, and the DC voltage Vc detected by a voltage detector 35 is input to the voltage command generating circuit 36A. The voltage command generating circuit 36A has a configuration wherein the DC voltage Vc detected by the voltage detector 35 is output as the initial value of the DC voltage command value $V_B$; the DC voltage command value $V_B$ is then decreased at a predetermined gradient; and it is made constant when it has reached to a set value $V_R$ (for example, the voltage of the battery 14).

Figure 4:
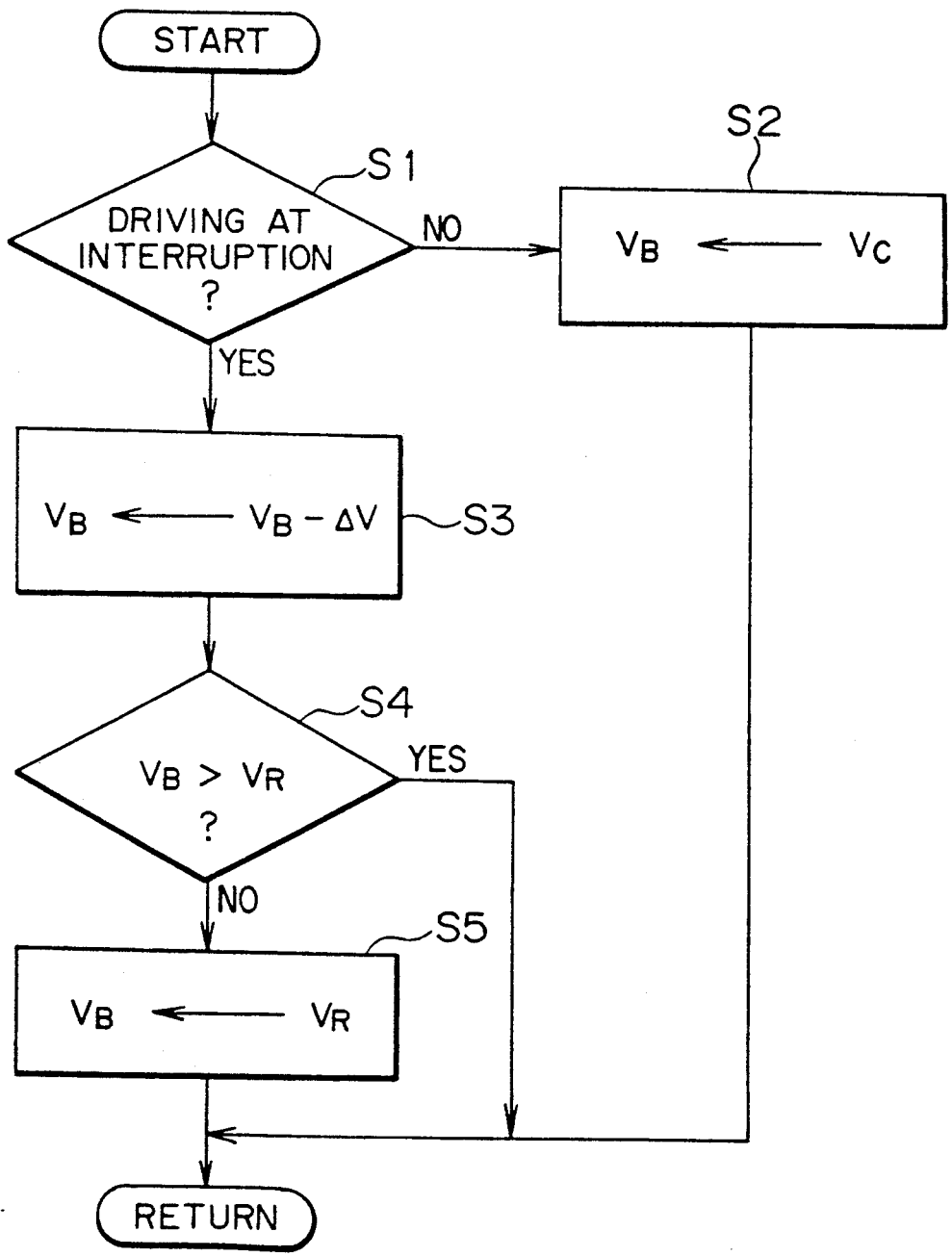
FIG. 4 is a flow chart showing the operation of the second embodiment.

FIG. 4 is a flow chart showing the operation of the second embodiment.

First, it is determined whether the current operation is the driving at interruption (step S1). If it is the normal driving rather than the driving at interruption, the charge voltage of the capacitor 4, i.e., the detected DC voltage Vc is set as the DC voltage command value $V_B$ (step S2).

Thus, the DC voltage Vc is always output from the voltage command generating circuit 36A during the normal driving.

When an interruption of the commercial power source 1 causes the operation to transfer to the driving at interruption and the switch 38 is closed thereafter, the DC voltage Vc becomes the initial value of the DC voltage command value $V_B$. Therefore, the capacitor 4 will not be discharged immediately after the start of the driving at interruption.

Next, if the operation is determined to be the driving at interruption at step S1, a predetermined pitch $\Delta V$ is subtracted from the previous DC voltage command value $V_B$ (step S3). For example, the first cycle of the step S3 provides a DC voltage command value of $V_c - \Delta V$. As a result, only a small predetermined quantity of electrical charge corresponding to the predetermined pitch $\Delta V$ is discharged from the charge voltage of the capacitor 4.

Thereafter, it is determined whether the DC voltage command value $V_B$ is greater than the set value $V_R$ (step S4); a return is made to step S1 if $V_B > V_R$; and, if the driving at interruption is being carried out, the predetermined pitch $\Delta V$ is subtracted at step S3. Thus, the DC voltage command value $V_B$ is controlled so that it will decrease at a predetermined gradient, and the capacitor 4 will continue to discharge the predetermined quantity of electrical charge at a time.

In this case, since the predetermined pitch $\Delta V$ that is the decrement of the DC voltage set value $V_R$ has been determined according to a predetermined gradient which is limited by the allowable charge/discharge current of the capacitor 4 and the like, the charge voltage of the capacitor 4 is controlled so that it will stably decrease.

When it is determined at step S4 that the DC voltage command value $V_B$ has reached the set value $V_R$, the set value $V_R$ is taken as the DC voltage command value $V_B$ (step S5). Thus, the DC voltage command value $V_B$ is clipped at the set value $V_R$ to be stable and, thereafter, the DC voltage across the capacitor 4 is controlled so that it will equal the set value $V_R$.

As described above, by controlling the DC voltage command value $V_B$ so that it will decrease down to a normal set value $V_R$ at a predetermined gradient starting with, as the initial value, the DC voltage Vc appearing immediately after the beginning of the driving at interruption, the charge voltage of the capacitor 4 is gradually discharged until the set value is reached, the discharged energy being consumed by the induction motor 6.

Thereafter, the induction motor 6 is critical-damping-controlled so that the DC voltage Vc will be constant at the set value $V_R$, and will be in a state wherein it generates substantially no output.

While the DC voltage command value $V_B$ is being controlled as described above, the control circuit 7A controls the induction motor 6 so that the DC voltage Vc will conform to the DC voltage command value $V_B$. As a result, substantially no regenerative power is generated at the DC side of the regular inverter 5, and no deterioration occurs at the capacitor 4 because it is not rapidly discharged.

What is claimed is:

1. A device for driving an elevator at the time of a service interruption comprising:

an induction motor for driving an elevator, a converter for converting the AC voltage supplied by a commercial power source into a DC voltage, a capacitor for smoothing the DC voltage obtained by said converter, a DC voltage detector for detecting the DC voltage across said capacitor, a regular inverter for converting the DC voltage smoothed by said capacitor into an AC voltage to drive and control said induction motor, a control circuit for generating an AC voltage command value and outputting it to said regular inverter, a battery for supplying power to said regular inverter when the commercial power source is interrupted, and a DC voltage suppression means for controlling the DC voltage command value generated by said control circuit by controlling the DC voltage across said capacitor detected by said DC voltage detector so that the DC voltage across said capacitor does not exceed a set value when the commercial power source is interrupted.

2. A device according to claim 1 further comprising a current detector for detecting the AC current supplied from said regular inverter to the primary winding of said induction motor, and a velocity detector for detecting the rotor angular velocity of said induction motor, said control circuit generating an AC voltage command value according to the AC current detected by said current detector and a rotor angular velocity detected by said velocity detector.

3. A device according to claim 2 wherein said control circuit comprises:

a first phase conversion means for generating a d-axis current and a q-axis current in a two-axis rotary coordinate system according to the AC current detected by said current detector and a rotor angular velocity detected by said velocity detector, a magnetic flux computing unit for computing the d-axis magnetic flux interlinking with the rotor at the secondary side of said induction motor according to the d-axis current and q-axis current generated by said first phase conversion means, a magnetic flux controller for generating a d-axis current command value according to the deviation between a d-axis magnetic flux command value and the d-axis magnetic flux computed by said magnetic flux computing unit, a velocity controller for generating a q-axis current command value according to the deviation between a rotor angular velocity command value and the rotor angular velocity detected by said velocity detector, a d-axis current controller for generating a d-axis voltage command value according to the deviation between the d-axis current command value generated by said magnetic flux controller and the d-axis current generated by said first phase conversion means, a q-axis current controller for generating a q-axis voltage command value according to the deviation between the q-axis current command value generated by said velocity controller and the q-axis current generated by said first phase conversion means, and a second phase conversion means for generating an AC voltage command value for said regular inverter according to the d-axis voltage command value generated by said d-axis current controller and the q-axis voltage command value generated by said q-axis current controller.

4. A device according to claim 3 wherein said DC voltage suppression means comprises:

a voltage command generating circuit for generating a DC voltage command value across said capacitor, a DC voltage controller for generating a d-axis magnetic flux correction value according to the deviation between the DC voltage detected by said DC voltage detector and the DC voltage command value generated by said voltage command generating circuit, a subtracter for generating a d-axis magnetic flux correction command value by obtaining the deviation between the d-axis magnetic flux command value and the d-axis magnetic flux correction value generated by said DC voltage controller, and a switch which is inserted between said DC voltage controller and said subtracter and is closed when the commercial power source is interrupted.

5. A device according to claim 4 wherein said voltage command generating circuit generates a constant DC voltage command value.

6. A device according to claim 4 wherein said voltage command generating circuit generates a gradually decreasing DC voltage command value which initially equals the DC voltage detected by said DC voltage detector when switchover to driving at interruption takes place, and which becomes constant after reaching a set value.

7. A device according to claim 1 further comprising an interruption inverter for interruption for converting the output voltage of said battery into an AC voltage and a switching means for switching the power source to said control circuit from the commercial power source to said inverter for interruption when the commercial power source is interrupted.

8. A device for driving an elevator at the time of a service interruption comprising:

an induction motor for driving an elevator;

a converter for converting the AC voltage supplied by a commercial power source into a DC voltage;

a capacitor for smoothing the DC voltage obtained by said converter;

a DC voltage detector for detecting the DC voltage across said capacitor;

a first inverter for converting the DC voltage smoothed by said capacitor into an AC voltage to drive and control said induction motor;

a control circuit for generating an AC voltage command value and outputting the AC voltage command value to said regular inverter;

a battery for supplying power to said regular inverter;

first and second switches connected between said battery and said regular inverter, said first and second switches being closed when the commercial power source is interrupted;

a voltage command generating circuit for generating a DC voltage command;

a first subtractor connected to said voltage command generating circuit and to said DC voltage detector for generating a difference signal representative of the difference between the DC voltage command and the DC voltage across said capacitor;

a DC voltage controller for generating a d-axis magnetic flux correction value according to the difference signal generated by said first subtractor;

a switch which interconnects said DC voltage controller with said control circuit and which is closed when the commerical power source is interrupted.

* * * * *